United States Patent

Kang

[11] Patent Number: 5,757,589
[45] Date of Patent: May 26, 1998

[54] HEAD DEVICE PROVIDED WITH A RECIPROCATING ACTUATOR FOR ALTERNATING AN AZIMUTH ANGLE OF A MAGNETIC GAP

[75] Inventor: Dong-Ho Kang, Seoul, Rep. of Korea

[73] Assignee: Daewoo Electronics, Co., Ltd, Rep. of Korea

[21] Appl. No.: 929,765

[22] Filed: Sep. 15, 1997

Related U.S. Application Data

[63] Continuation of Ser. No. 534,223, Sep. 26, 1995, abandoned.

[30] Foreign Application Priority Data

Nov. 21, 1994 [KR] Rep. of Korea ............... 1994-30557

[51] Int. Cl.$^6$ ............................................. G11B 5/588
[52] U.S. Cl. ............................... 360/109; 360/77.12
[58] Field of Search ........................ 360/76, 84, 85, 360/109, 130.21–130.24

[56] References Cited

U.S. PATENT DOCUMENTS

| | | | |
|---|---|---|---|
| 4,233,637 | 11/1980 | Kubota | 360/77.16 |
| 4,424,541 | 1/1984 | Koinuma et al. | 360/78.02 |
| 4,507,696 | 3/1985 | Hutter | 360/109 |
| 4,639,812 | 1/1987 | Nakamichi | 360/126 |
| 4,686,588 | 8/1987 | Goto et al. | 360/76 |
| 5,256,850 | 10/1993 | Maegawa et al. | 360/109 |
| 5,307,217 | 4/1994 | Saliba | 360/76 |
| 5,341,256 | 8/1994 | Murata et al. | 360/75 |
| 5,353,173 | 10/1994 | Yoo | 360/76 |
| 5,450,257 | 9/1995 | Tran et al. | 360/76 |
| 5,523,904 | 6/1996 | Saliba | 360/77.12 |

FOREIGN PATENT DOCUMENTS

| | | | |
|---|---|---|---|
| 1-151017 | 6/1989 | Japan | 360/76 |
| 1-298516 | 12/1989 | Japan | 360/76 |
| 3-30113 | 2/1991 | Japan | 360/76 |

*Primary Examiner*—Jefferson Evans
*Attorney, Agent, or Firm*—Pennie & Edmonds LLP

[57] ABSTRACT

A head device for use in a VCR comprises a head base with one end affixed to a rotary drum; a head chip that is installed at the other end of the head base and furnished with a vertical magnetic gap; and an actuator and a hinged leg for tilting the head chip up or down to thereby alter the azimuth angle of the magnetic gap. Such a head device makes it possible to manufacture rotary drums equipped with only one head. Since the azimuth angle of the magnetic gap is variable, such a head is capable of reading the signal recorded on a track of a magnetic tape, and by altering the azimuth inclination of its head chip, reading the signal on the adjacent track as well.

1 Claim, 3 Drawing Sheets

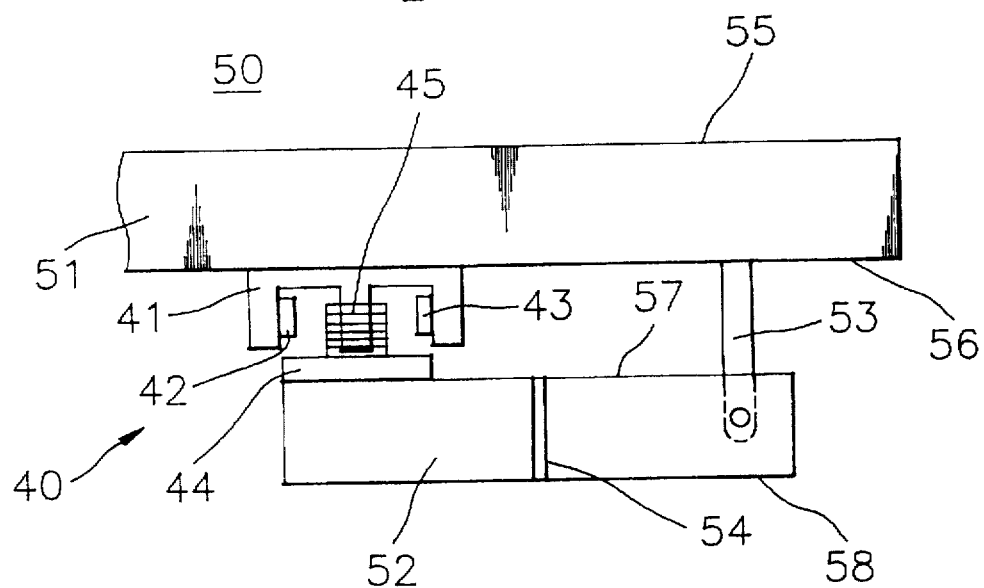
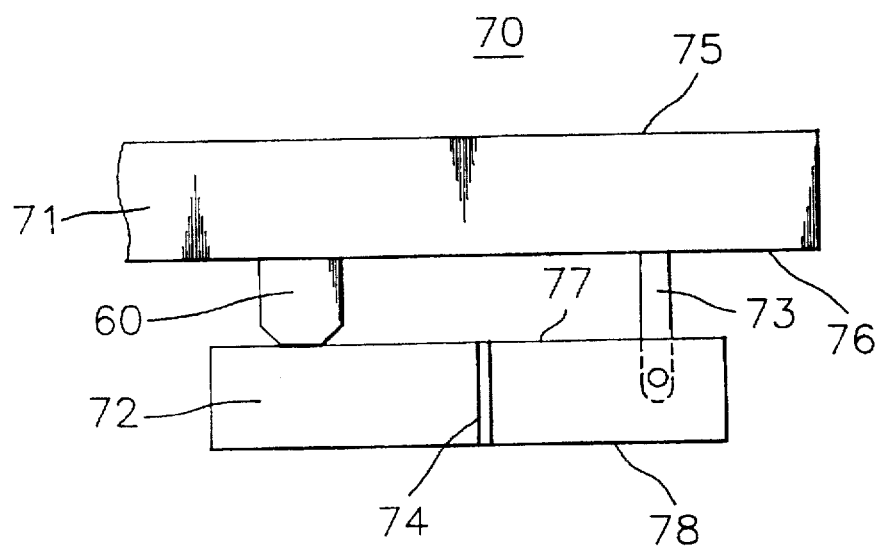

HEAD DEVICE PROVIDED WITH A RECIPROCATING ACTUATOR FOR ALTERNATING AN AZIMUTH ANGLE OF A MAGNETIC GAP

This is a continuation of application Ser. No. 08/534,223, filed Sep. 26, 1995, now abandoned.

FIELD OF THE INVENTION

The present invention relates to a head drum assembly for use in a video cassette recorder ("VCR"); and, more particularly, to an improved head capable of performing the role of two conventional heads based on its ability to modify the azimuth angle of its magnetic gap.

DESCRIPTION OF THE PRIOR ART

A rotary drum in a conventional head drum assembly for use in a VCR is normally equipped with an even number of heads arranged in pairs. The two heads making up one pair are located on diametrically opposite sides of the rotary drum from each other, i.e., at an angular separation of 180°. Each of the heads in each pair is equipped with a magnetic gap having an azimuth inclination of a same magnitude but opposite in direction from the magnetic gap of its partner on the other side of the rotary drum.

There is shown in FIG. 1 a perspective view of a conventional rotary drum 5 equipped with a pair of heads 1 located on opposite sides. Each of the heads 1 comprises a head base 2, one end of which is attached to the rotary drum 5, and the other end of which is furnished with a head chip 3. The head chip 3 is equipped with a magnetic gap 4 having a predetermined azimuth inclination.

In the conventional rotary drum 5, each of the heads in each pair take turns reading a signal recorded on a magnetic tape (not shown). After one head passes through a tape track while reading a signal written thereon, the tape is advanced by one track width while the drum 5 rotates through 180° and the other head then proceeds to read from a following tape track. As illustrated in FIG. 3, the signals on adjacent tracks are recorded with different azimuth inclinations to prevent an occurrence of cross talks. To successfully read signals recorded in this fashion, the magnetic gap in each of the heads is given an azimuth inclination matching the azimuth inclination of the track it is supposed to read. As shown in FIGS. 2A and 2B, the two heads 1 located on diametrically opposite sides of the drum 5 are given magnetic gap azimuth inclinations that are opposite in direction, i.e., if one of the heads has an azimuth gap inclination of +Θ, its partner located on the diametrically opposite side of the rotary drum has an azimuth gap inclination of −Θ.

The necessity of giving different azimuth inclinations to signals recorded in adjacent tracks and the fact that the azimuth angles of the magnetic gaps in the conventional heads are fixed have brought about the consequence that rotary drums must be equipped with at least a pair of heads. Accordingly, prior art head drum assemblies require at least two heads to deal with tracks recorded with different azimuth inclinations.

SUMMARY OF THE INVENTION

It is, therefore, a primary object of the present invention to provide an improved head capable of modifying an azimuth angle of a magnetic gap provided therein, to thereby fulfill the role performed conventionally by a pair of heads.

In accordance with the present invention, there is provided a head device for use in a VCR comprising: a head base, one end of which is fixed to a rotary drum; a head chip installed at the other end of the head base and furnished with a magnetic gap; and means for altering a magnetic gap azimuth angle.

BRIEF DESCRIPTION OF THE DRAWINGS

The above and other objects and features of the present invention will become apparent from the following description of preferred embodiments when taken in conjunction with the accompanying drawings, in which:

FIG. 5 illustrates a frontal view of a second preferred embodiment of the present invention; and FIG. 6 offers a frontal view of a third preferred embodiment of the present invention.

DETAILED DESCRIPTION OF THE PREFERRED EMBODIMENTS

Figure 4:
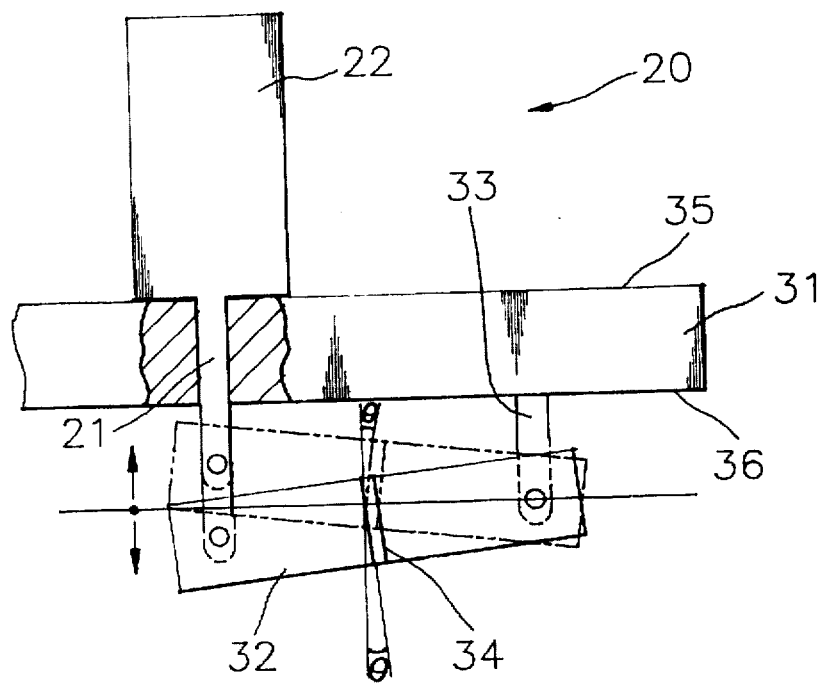
FIG. 4 provides a frontal view of a first preferred embodiment of the present invention.

Referring to FIG. 4, there is shown an inventive head 30 for use in a rotary drum of a VCR. The head 30 comprises a head base 31; a head chip 32 furnished with a magnetic gap 34; a first hinge leg 33; and a magnetic gap azimuth angle altering means 20 including an actuator 22, and a second hinge leg 21 arranged to move in a reciprocating manner.

The actuator 22 is installed on an upper surface 35 of the head base 31, and connected to a controller (not shown), from which it receives instructions. The second hinge leg 21 is attached to the actuator 22 and traverses an entire thickness of the head base 31 through a perforation prepared therein, extruding past a bottom surface 36 of the head base 31.

Meanwhile, the first hinge leg 33 connects one end of the head chip 32 to the bottom surface 36 of the head base 31. The other end of the head chip 32 is connected to the actuator 22 by means of the second hinge leg 21. Thus, in response to the second hinge leg 21 being pulled up or down, the head chip 32 tilts up or down, pivoting around the end connected to the first hinge leg 33.

In addition, the magnetic gap 34 provided in the head chip 32 is oriented vertically. In other words, the magnetic gap 34 divides the head chip 32 into two rectangles.

Figure 1:
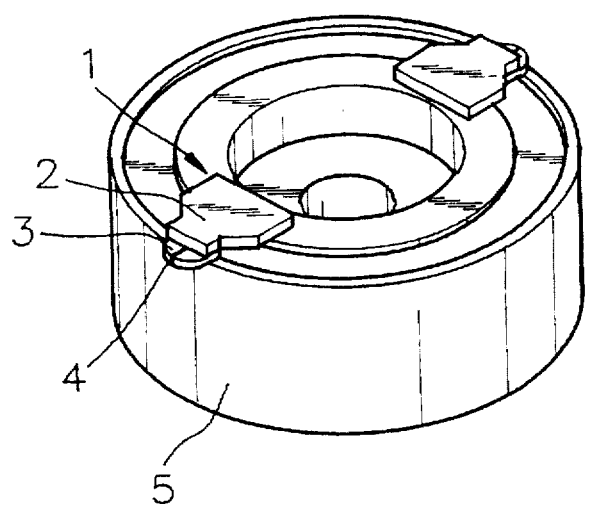
FIG. 1 presents a perspective view of a rotary drum of prior art.
Figure 2A:
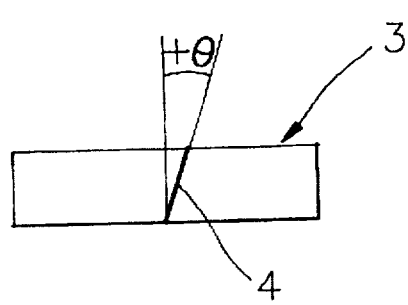
FIGS. 2A and 2B show the azimuth angles of two heads installed on diametrically opposite sides of the conventional rotary drum.
Figure 2B:
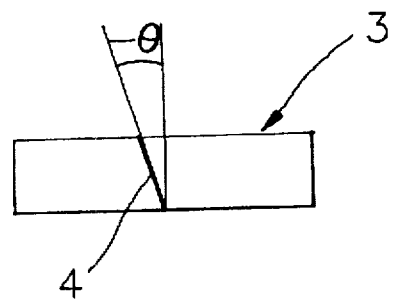
Figure 3:
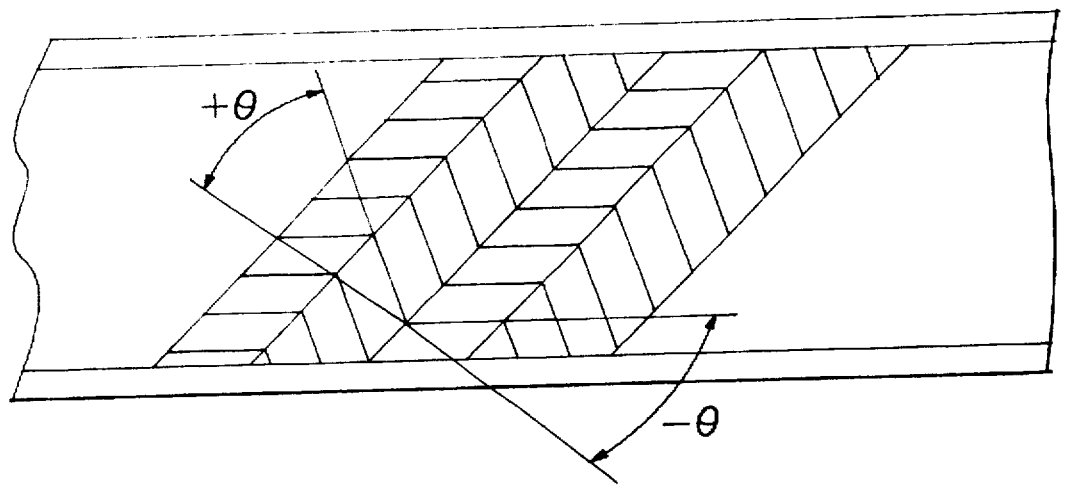
FIG. 3 depicts a signal recording pattern in a magnetic tape.

Further, in accordance with the present invention, an azimuth angle of the magnetic gap 34 can be modified by raising or lowering the end of the head chip 32 connected to the actuator 22. The controller transmits an electric current, and, in response thereto, the actuator 22 pulls up or pushes down the second hinge leg 21 connected to the head chip 32. This in turn raises or lowers the end of the head chip 32 linked to the actuator 22, with the end of the head chip 32 attached to the first hinge leg 33 acting as a pivot. The tilting of the head chip 32 modifies the orientation of the magnetic gap 34. Thus, a desired azimuth inclination for the magnetic gap 34 can be attained by raising or lowering the end of the head chip 32 connected to the actuator 22 by an appropriate amount. For example, to read a magnetic tape with a set of signals having +Θ and −Θ azimuth inclinations recorded on alternating tracks, as shown in FIG. 3, the head chip 32 will be alternatively raised or lowered so that the magnetic gap 34 is given an azimuth inclination of +Θ or −Θ, respectively.

FIG. 5 illustrates another preferred embodiment of the present invention, wherein an alternative magnetic gap azimuth angle altering means 40 is employed.

The inventive head 50 depicted in FIG. 5 comprises a head base 51; a head chip 52 equipped with a magnetic gap 54; a hinge leg 53; and the magnetic gap azimuth angle altering means 40.

The head base 51 is furnished with a top and a bottom surfaces 55, 56. Likewise, the head chip 52 includes a top and a bottom surfaces 57 and 58. In addition, one end of the head chip 52 is connected to the bottom surface 56 of the head base 51 by means of the hinge leg 53.

The magnetic gap azimuth angle altering means 40 employed in the head 50 includes a yoke 41 affixed to the bottom surface 56 of the head base 51 and provided with two flanking prongs and one central prong; a pair of permanent magnets 42, 43, each installed on an inner side of one of the flanking prongs of the yoke 41; a coil base 44 attached to the top surface 57 of the head chip 52 and provided with a top surface; and a coil 45 installed on the top surface of the coil base 44, fitting around, but not in contact with, the central prong of the yoke 41, thereby providing a driving force necessary to tilt the head chip 52 up or down around the end attached to the hinge leg 53.

The magnetic gap azimuth angle altering means 40 of the second embodiment is operated by running an appropriate electric current through the coil 45. A magnetic field generated by the electric current interacts with a magnetic field around the permanent magnets 42, 43 to generate an attractive or a repulsive force. As the coil 45 is pulled up towards or pushed down away from the bottom surface 56 of the head base 51, the head chip 52 attached therein is tilted by a predetermined amount, changing the azimuth inclination of the magnetic gap 54.

FIG. 6 represents yet another preferred embodiment of the present invention, wherein a shape memory alloy block 60 is employed.

The third embodiment presented in FIG. 6 comprises a head base 71; a head chip 72 furnished with a magnetic gap 74; a hinge leg 73; and the shape memory alloy block 60.

The head base 71 includes a top and a bottom surfaces 75, 76. Likewise, the head chip 72 is furnished with a top and a bottom surfaces 77, 78. The hinge leg 73 connects one end of the head chip 72 to the bottom surface 76 of the head base 71. Meanwhile, the shape memory alloy block 60 is attached to the other end of the head chip 72, and to the bottom surface of the head base 76.

The inventive head 70 described above changes the azimuth inclination of the magnetic gap 74 provided therein by running an electric current through the shape memory alloy block 60. As the block 60 deforms in response to the electric current, the head chip 72 tilts up or down by an appropriate amount, changing the azimuth inclination of the magnetic gap 74.

All of the preferred embodiments of the present invention described above are capable of modifying the azimuth inclination of a magnetic gap incorporated therein, thereby allowing the rotary drum equipped with only one head to read information stored on the magnetic tape having alternating tracks recorded with signals of opposite azimuth inclinations. The preferred embodiments of the present invention rotate the rotary drum incorporated therein at twice the conventional speed, allowing the drum to go through one full revolution after reading with one head and bring the same one head around to read a next track of the magnetic tape that, in a conventional VCR, would have been read by a second head installed on the opposite side of the rotary drum. In addition, the preferred embodiments of the present invention modify the azimuth inclination of the magnetic gap 14 therein to match the azimuth inclination of a signal recorded in the next track while the head is coming around the other side of the rotary drum and not in contact with the tape.

The preferred embodiments of the present invention described above thus have the advantage that only one head needs to be installed in the rotary drum.

While the present invention has been shown and described with reference to the particular embodiments, it will be apparent to those skilled in the art that many changes and modifications may be made without departing from the spirit and scope of the invention as defined in the appended claims.

What is claimed is:

1. A head for use in a rotary drum of a VCR comprising:
   a head base, one end of which is fixed to a rotary drum;
   a head chip, installed at the other end of the head base and furnished with a magnetic gap; and
   an actuator arranged to tilt the head chip relative to the head base between a positive azimuth angle and a negative azimuth angle during each revolution of the rotary drum, thereby allowing the head to read information stored on a magnetic tape having alternating tracks recorded with signals of opposite azimuth inclinations,
   said actuator being disposed on a first surface of the head base and having a leg member extending through the head base and arranged to move in a reciprocating manner and operatively engaged to a first end of the head chip, said leg member moving said first end of the head chip towards and away from a second surface of said head base, upon application of an electric current to said actuator.

* * * * *